United States Patent [19]

Mochizuki et al.

[11] Patent Number: 4,843,531
[45] Date of Patent: Jun. 27, 1989

[54] HOUSING FOR VEHICULAR LAMP ASSEMBLY

[75] Inventors: Hideharu Mochizuki; Junji Toki, both of Shizuoka, Japan

[73] Assignee: Koito Manufacturing Co., Ltd., Tokyo, Japan

[21] Appl. No.: 172,686

[22] Filed: Mar. 23, 1988

[30] Foreign Application Priority Data

Nov. 4, 1987 [JP] Japan .................. 62-277360

[51] Int. Cl.⁴ .............................. F21M 3/00
[52] U.S. Cl. ........................... 362/421; 362/61; 362/80; 362/371
[58] Field of Search ............ 362/61, 66, 80, 269, 362/273, 285, 289, 362, 371, 421

[56] References Cited

U.S. PATENT DOCUMENTS

| | | | |
|---|---|---|---|
| 4,343,031 | 8/1982 | Liebegott | 362/80 |
| 4,621,307 | 11/1986 | Weber | 362/66 |
| 4,707,768 | 11/1987 | Ball | 362/66 |
| 4,712,164 | 12/1987 | McMahan et al. | 362/66 |
| 4,722,033 | 1/1988 | Van Duyn et al. | 362/80 |

Primary Examiner—Stephen F. Husar
Attorney, Agent, or Firm—Sughrue, Mion, Zinn, Macpeak & Seas

[57] ABSTRACT

The vehicular lamp assembly housing of the present invention is integrally formed of a synthetic resin, and in a plane shape thereof there is constituted an annular structure having a through hole for insertion therein of the rear end portion of a vehicular lamp assembly and at least a portion thereof is retracted in the depth direction to form a three-dimensional curved surface. The inner and outer peripheral portions of the annular structure are respectively formed with inner and outer peripheral edges bent backwards approximately perpendicularly from the plane portion of the annular structure. Further, between the said inner and outer peripheral edges there is formed an annular or generally annular, continuous reinforcing rib, and also formed a large number of connecting ribs at suitable intervals in a crossing relation to the reinforcing rib.

7 Claims, 6 Drawing Sheets

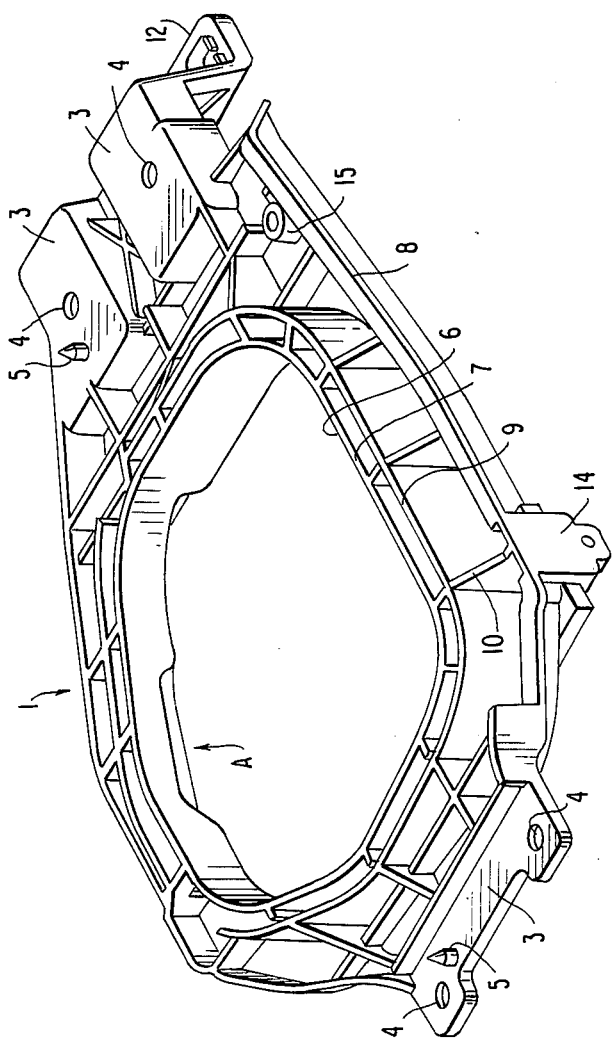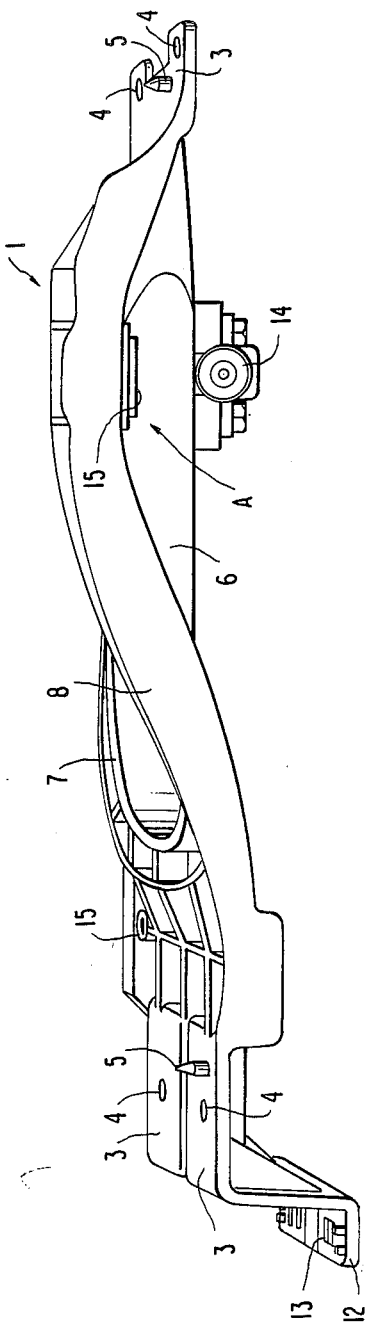

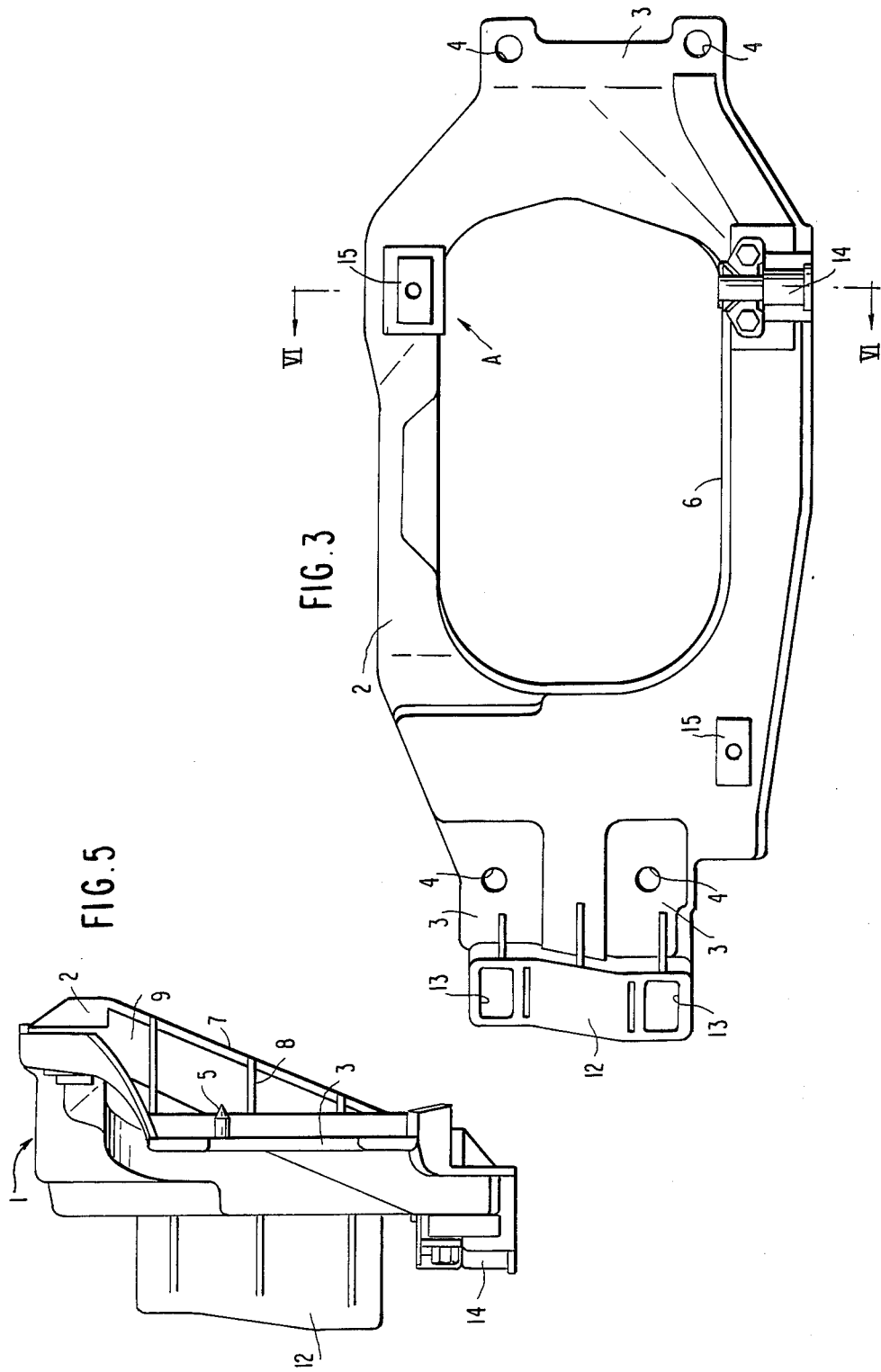

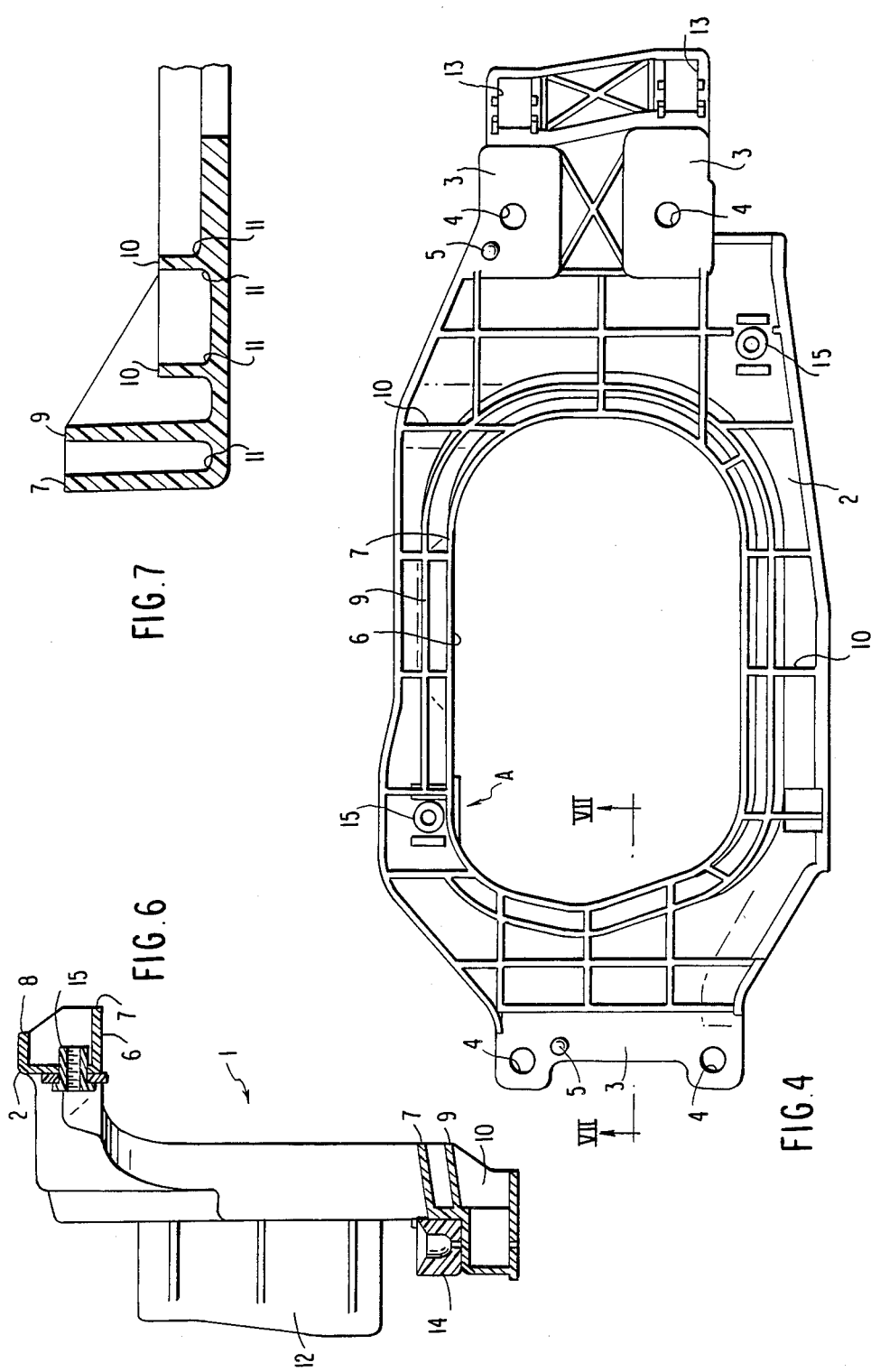

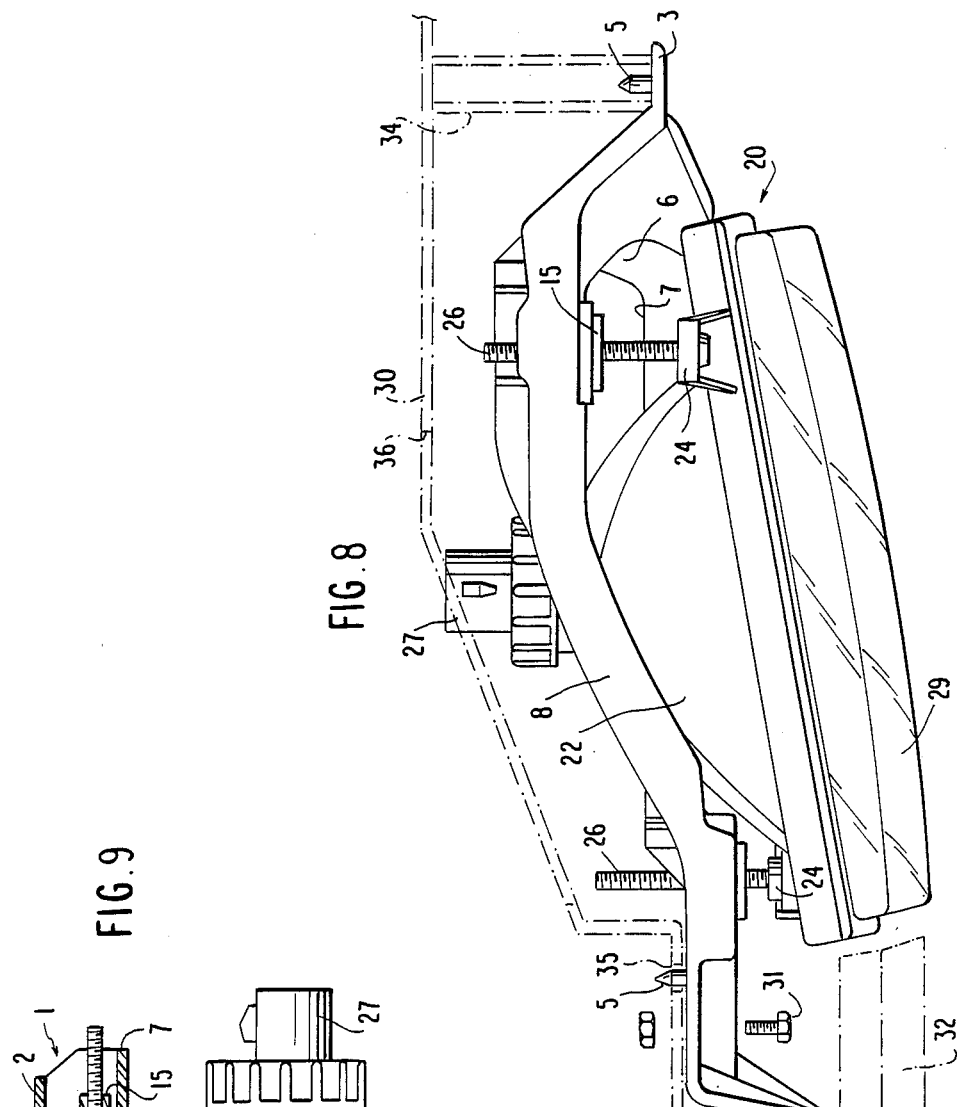

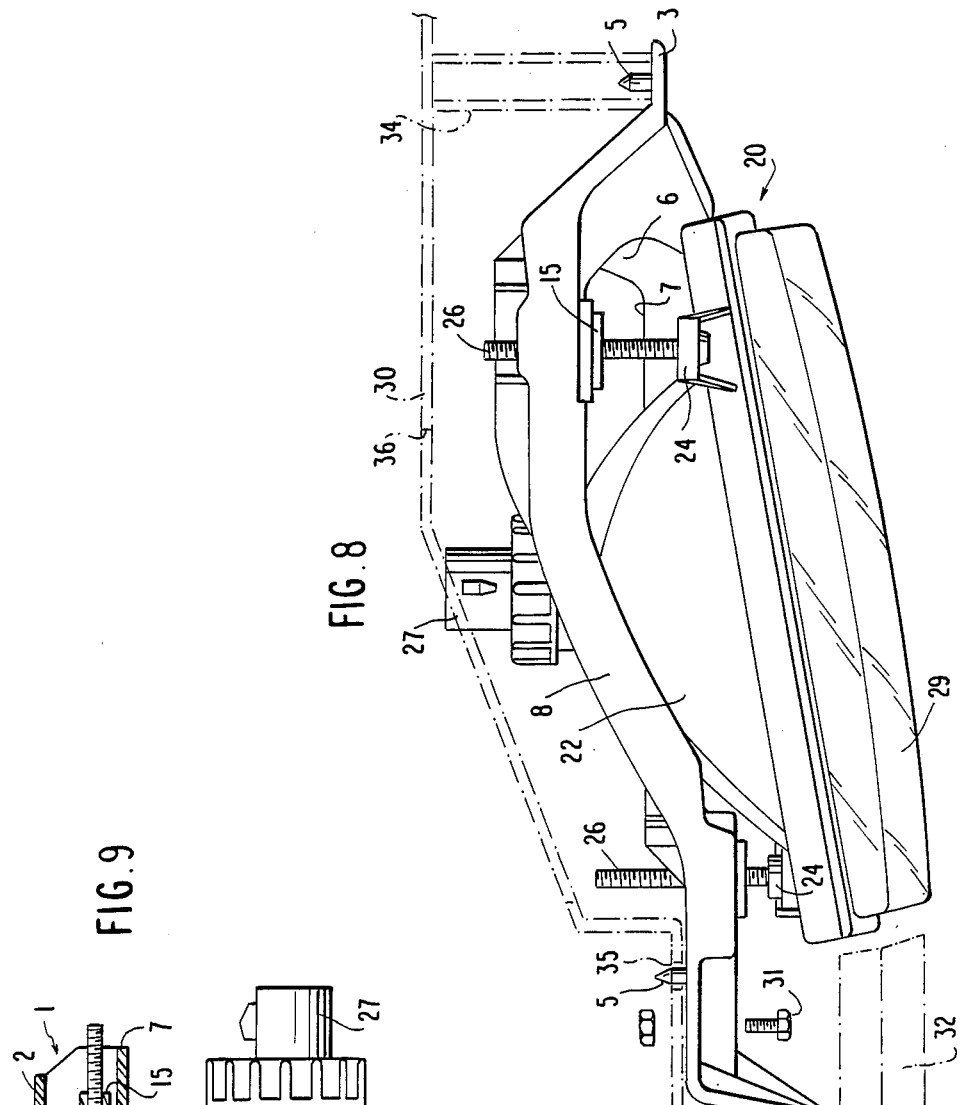

HOUSING FOR VEHICULAR LAMP ASSEMBLY

BACKGROUND OF THE INVENTION

1. Field of the Invention

The present invention relates to a housing for mounting a lamp assembly such as a vehicular headlamp assembly to a vehicle body and particularly to a housing for a vehicular lamp assembly superior in impact strength, light in weight and capable of being provided at low cost.

2. Prior Art

Heretofore, as shown in FIG. 13, there has been used a housing formed by a pressed steel sheet as a housing for mounting a vehicular headlamp assembly to the body of an automobile. A vehicular lamp assembly housing 50 of this type is for mounting a body 54 of a vehicular lamp assembly which comprises a lens 51 fitted over a front opening to seal the opening, a lamp 52 as a light source supported at the rear end and a reflecting mirror 53 formed along the inner surface of the body, in such a manner that the angle in a facial direction of the lamp assembly body can be changed freely. The housing 50 is generally of a planar, annular structure provided on one side thereof with an inclination adjusting means 55 and an inclination support means 56, while on the other side there is constituted a mounting structure 57 by steel sheet for fixing the housing 50 to the body of an automobile, and at a central part of the housing there is formed at through hole 58 of a size permitting insertion therein of the rear end portion of the body 54. The inclination adjusting means 55, inclination support means 56 and mounting structure 57 are constituted as pressed members separate from the housing 50 and are rendered integral with the housing 50 by a suitable method such as welding or bolting.

OBJECTS OF THE INVENTION

Recently there has been a demand for reducing the weight of automobiles to improve fuel economy and also as to the vehicular lamp assembly housing 50 of steel sheet mentioned above, it has been desired to constitute the housing using a synthetic resin to reduce the weight thereof. However the use of resin for the vehicular lamp assembly housing 50 has not been realized yet because the housing is required to have a predetermined strength high enough to support the body 54 of the lamp assembly, and up to now there have been used steel sheet housings.

Further, in constituting the vehicular lamp assembly housing 50 using steel sheet, it is necessary that the inclination adjusting means 55 for adjusting the angle relative to the body of an automobile, the inclination support means 56, the mounting structure 57 for the automobile body, and other plural steel sheet members including projections, be fabricated as separate members using a die and then rendered integral by such a method as welding or bolting. Consequently, a large number of components and working steps are required and it takes much time and labor for assembly or mounting.

The present invention has been accomplished in view of the above-mentioned problems. It is the first object thereof to provide a vehicular lamp assembly housing obtained by constituting the conventional steel sheet housing 50 using a synthetic resin in place of steel sheet, the synthetic resin housing being superior in impact strength and permitting the reduction of weight of a vehicle.

It is the second object of the present invention to provide a vehicular lamp assembly housing of a low cost fabricated by integral molding using a synthetic resin material to simplify the structure of the housing itself and reduce the number of working steps.

SUMMARY OF THE INVENTION

The vehicular lamp assembly housing of the present invention, which supports the body of a vehicular lamp assembly adjustably in the mounting angle of the same body and which is fixed to the body of a vehicle in a predetermined position, is characterized in that it is constituted as an annular structure in a plane shape thereof wherein there is centrally formed a through hole which permits insertion therein of the rear end portion of the vehicular lamp assembly, and a portion thereof is retracted in the depth direction to form a three-dimensional curved surface, that the inner and outer peripheral portions are respectively formed with annular, inner and outer peripheral edges bent backwards approximately perpendicularly to the surface of the annular structure, that an annular or nearly annular, continuous reinforcing rib is erected between the inner and outer peripheral edges, and that a multitude of connecting ribs are integrally formed of a fiber-reinforced synthetic resin at suitable intervals in a crossing relation to the reinforcing rib.

A desired strength can be attained by using FRPP which comprises polypropylene and 40% glass fibers mixed therein.

Generally in the case of FRPP, as shown in FIG. 11 which is a graph of impact resistance and in FIGS. 12(a) and (b) which are graphs of rigidity (aiming holding force), impact resistance and rigidity are improved by increasing the proportion of glass fibers relative to polypropylene. However, as the proportion of glass fibers added to the resin material increases, the degree of design freedom associated with moldability becomes lower. In the present invention, therefore, a preferred range of glass fiber proportion is 30% to 50%.

According to the above construction, that is, a three-dimensionally twisted structure in which an annular molded frame is deformed in front and in the rear in the facial direction, a circumferential pressure is allowed to escape through a facial distortion, while a facial pressure is allowed to escape through a circumferential distortion. Thus, impact energy applied to the housing is extinguished by distortion to avoid damage. Additionally, since the inner and outer peripheral edge reinforcing rib and connecting ribs are integrally formed on the rear face of the annular frame, the rigidity of the entire annular frame can be improved without increase of weight.

BRIEF DESCRIPTION OF THE DRAWINGS

FIG. 1 is a perspective view as seen from the back of a vehicular lamp assembly housing embodying the present invention;

FIG. 2 is a perspective view of the housing as seen in a plane direction;

FIG. 3 is a front view of the housing;

FIG. 4 is a rear view thereof;

FIG. 5 is a right side view thereof;

FIG. 6 is a sectional view taken on line VI—VI in FIG. 3;

Figure 10:
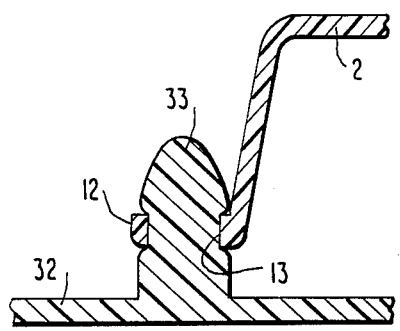
Figure 13:
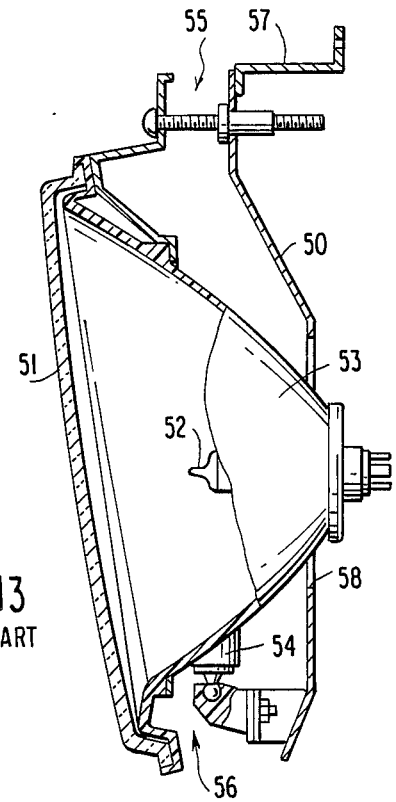
Figure 11:
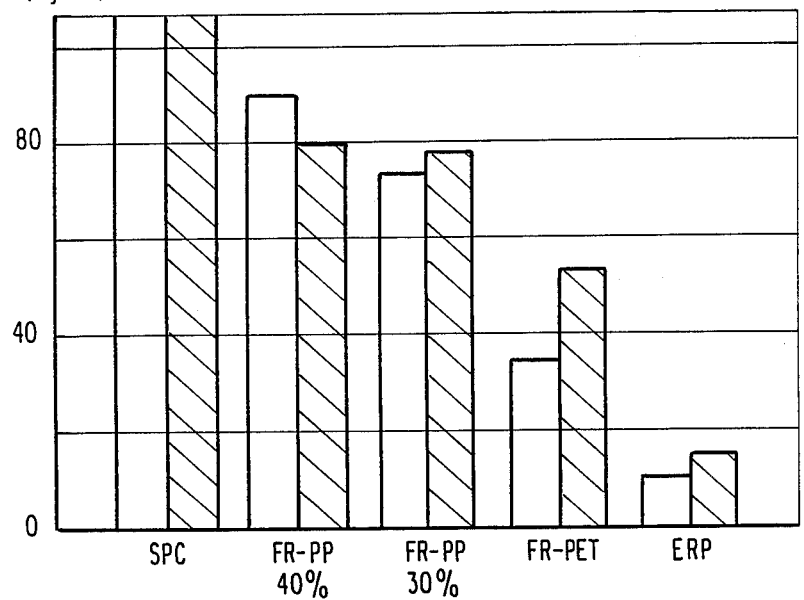

It goes without saying that the above construction can be suitably modified or changed in design within the scope of the objects of the present invention. For example, the method of mounting the headlamp assembly to the housing and the method of mounting the housing to the vehicle body side are not limited in their structure to the above embodiment.

Thus, the body of the vehicular lamp assembly housing is constituted by a polypropylene resin incorporating 30% to 50% of glass fibers therein, as described above, whereby the reduction in weight of the components can be attained without impairing impact resistance and rigidity. The housing of the invention not only has the feature that circumferential or facial pressure can be absorbed by facial or outer peripheral distortion to avoid damage of the housing itself, but also has an outstanding effect that the number of components of the housing and of working steps can be reduced to a remarkable extent to thereby improve the efficiency of the mounting operation.

What is claimed and desired to be secured by Letters Patent of the United States is:

1. In a vehicular lamp assembly housing for supporting the body of a vehicular lamp assembly such as a headlamp assembly adjustably in the mounting angle of said lamp assembly body, said housing being fixed to a vehicle body in a predetermined position, the improvement characterized in that:
   (A) the housing is constituted as an annular structure in a plane shape thereof wherein there is centrally formed therethrough a hole which permits insertion therein of the rear end portion of the vehicular lamp assembly, and at least a portion of said housing extends in the depth direction to form a surface curved in three dimensions;
   (B) the inner and outer peripheral portions of the annular structure are respectively formed with annular, inner and outer peripheral edges bent backwards approximately perpendicularly to the surface of the annular structure;
   (C) an annular or generally annular, continuous reinforcing rib is erected between said inner and outer peripheral edges and a multitude of connecting ribs are formed at appropriate intervals in a crossing relation to said reinforcing rib; and
   (D) said annular structure is obtained by integral molding using a fiber-reinforced synthetic resin.

2. A vehicular lamp assembly housing according to claim 1, wherein a flat portion serving as a mounting portion for the vehicle body is formed in a predetermined position of the annular structure.

3. A vehicular lamp assembly housing according to claim 1, wherein said ribs are each integrally formed with a concave portion which is thicker in the crossing direction, in the position of contact with the inner surface portion of the annular structure.

4. A vehicular lamp assembly housing according to claim 1, wherein a grille connecting edge is formed on one side of the annular structure.

5. A vehicular lamp assembly housing according to claim 1, wherein at least one joint member and two bolt receiving members are provided in predetermined positions of the annular structure.

6. A vehicular lamp assembly housing according to claim 5, wherein the headlamp assembly is supported adjustably in its angle by means of one universal joint rod fitted in said at least one joint member and two angle adjusting bolts threadedly engaged with said bolt receiving members.

7. A vehicular lamp assembly housing according to any one of claims 1, 2, 3, 4 and 5, wherein said fiber-reinforced synthetic resin is an FRPP resin comprising a polypropylene resin and 30% to 50% of glass fibers mixed therein.

* * * * *